Dec. 11, 1945.  E. R. CAPITA  2,390,498
APPARATUS AND METHOD FOR APPLYING SOLDER
Filed Dec. 12, 1941
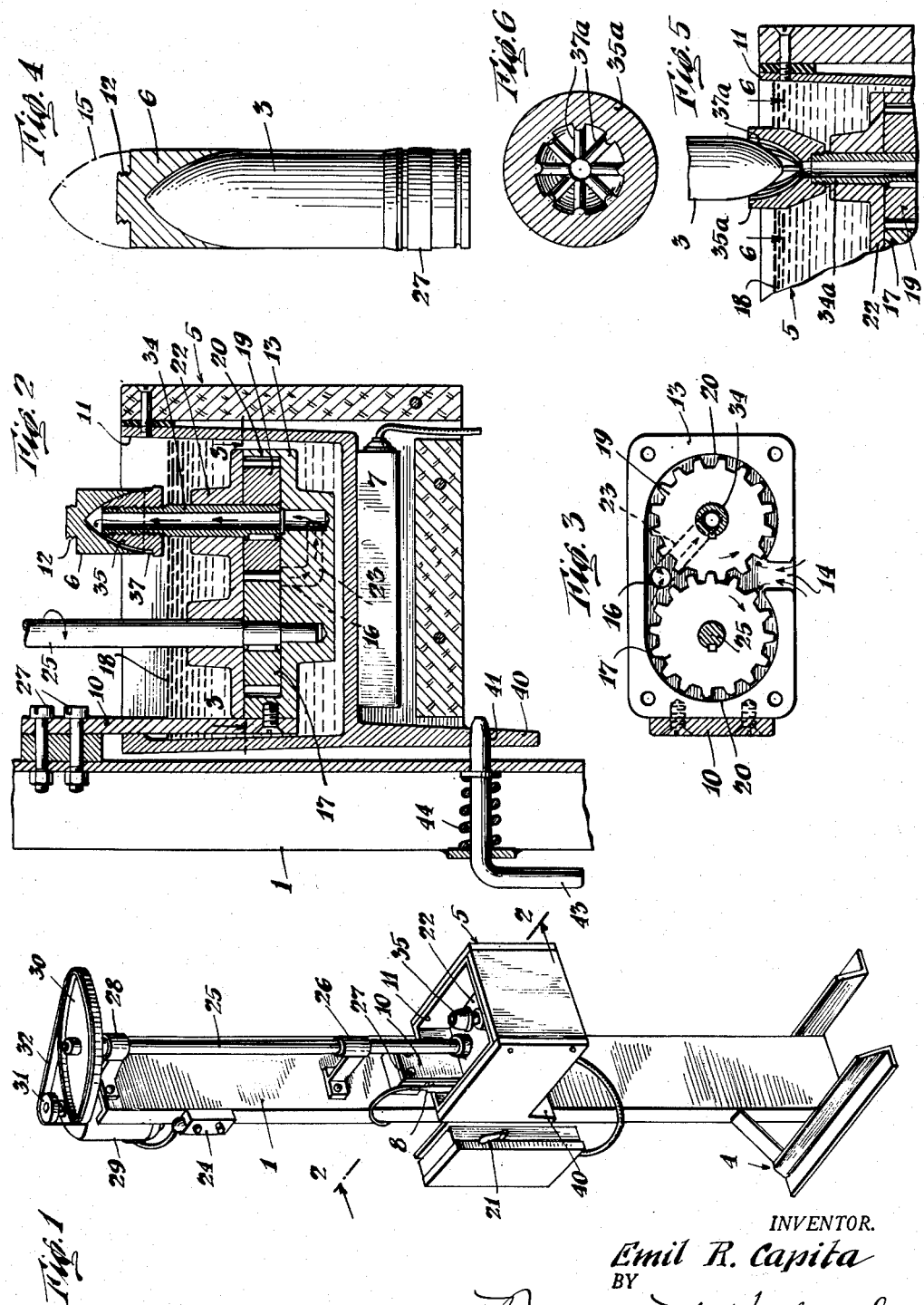
INVENTOR.
Emil R. Capita
BY
Norman R. Holland
ATTORNEY Patented Dec. 11, 1945

2,390,498

UNITED STATES PATENT OFFICE 2,390,498

APPARATUS AND METHOD FOR APPLYING SOLDER

Emil R. Capita, Flushing, N. Y.

Application December 12, 1941, Serial No. 422,702

12 Claims. (Cl. 117—97)

The present invention relates to a solder applying means and method, the preferred embodiment being illustrated for the application of solder to the parts of armor piercing projectiles.

Armor piercing projectiles are intended to penetrate armor. They generally comprise a shell case made of steel, over the point of which is fitted a steel cap. An annular copper band, called a rotating band, is fitted around the projectile adjacent the base thereof and engages the rifling of a gun barrel during firing; the band cooperates with the rifling of the barrel to give the projectile a whirl about its longitudinal axis to prevent it from tumbling over and over in flight and thus holds it accurately on its course while in flight. The thickness of armor plate which a projectile will penetrate depends to a great extent upon the calibre of the shell.

The steel cap for the shell has a hollow or concave portion at one side shaped so that it may fit over the pointed end of the steel shell case. The cap and shell case are usually attached to each other by soldering them together. The soldered parts are subjected to severe government tests to be sure that they are effectively united. Hence it is important that the united surfaces of the parts be adequately and completely covered with flux and solder. Particular difficulty has been encountered in properly coating the hollow or concave side of the steel cap with flux and solder. The present invention relates more particularly to the application of solder thereto. Previous practice has been to apply a coating of flux and solder manually to the inside of the cap; the operator first applied some flux inside the hollow or cavity of the cap and thereafter wiped or spread the solder around the cavity walls to make it stick thereto. In addition to the operation being slow and costly, it was difficult to obtain a coating of solder of adequate thickness and uniformity over the wall of the cavity in this way. As a result a large percentage of the caps would come off in the government tests and had to be rejected.

The present invention aims to overcome above and other difficulties by providing a machine and method which may be utilized to apply solder coatings to caps in large numbers at relatively low cost. The invention further contemplates the elimination of improperly soldered shell parts by the production of solder coated caps of more uniform quality with a coating of solder of adequate thickness spread substantially uniformly over the hollow or concave surface of the caps.

An object of the present invention is to provide a new and improved method and mechanism for applying solder coatings to articles.

Another object of the present invention is to provide a new and improved method and mechanism for applying solder coatings to the surfaces of parts of armor piercing projectiles.

Another object of the present invention is to provide a new and improved means for bringing solder into contact with the inside of the cap of an armor piercing shell.

Another object of the present invention is to provide a new and improved means for spreading a coating of solder substantially uniformly over a surface of an armor piercing shell part.

Another object of the present invention is to provide means for applying solder to the ends of shell cases.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 illustrates a perspective view of a preferred embodiment of the invention;

Fig. 2 illustrates a fragmentary sectional view along the line 2—2 of Fig. 1;

Fig. 3 is a sectional view along the line 3—3 of Fig. 2 illustrating the means for conveying the molten solder;

Fig. 4 is a diagrammatic view partly in section illustrating the parts of an armor piercing projectile to which solder may be applied by the present invention;

Fig. 5 illustrates an embodiment for the application of solder to convex surfaces; and Fig. 6 is an enlarged sectional view along the line 6—6 of Fig. 5.

Referring again to the drawing, and more particularly to Fig. 4 thereof, there is illustrated a projectile comprising a shell case 3, over the pointed end of which is fitted a cap 6. The cap 6 is preferably hollowed out at one side thereof so that it may fit over the pointed end of the shell case 3 in the manner shown in Fig. 4. The front end of the shell cap 3 may be provided with a threaded projection 12, to which is preferably attached a second cap 15 having a streamlined shape. The second cap 15 decreases the air resistance to the projectile while in flight. A rotating band 27 is secured to the shell case 3 adjacent the base thereof.

The present new and improved method and apparatus for applying solder to a shell cap 6 are illustrated in Fig. 1. The supporting framework may comprise a column member 1, formed from any suitable stock shape of material such as a channel or I beam, maintained in upright position by an enlarged base or foot portion constructed of suitable angle irons and connecting members 4. The upright column and its supporting base may be welded, riveted or otherwise secured together.

A solder applying mechanism 5 is releasably supported, as will be hereinafter described, intermediate the ends of the upright column member 1 and is preferably located at a height which is convenient for an operator of the machine. The solder applying mechanism 5 may comprise a steel or cast iron container 11 adapted to contain solid or liquid solder. A heating element 7 located beneath the container 11 is adapted to maintain the solder in molten condition. A suitable thermostat 8 preferably extends into the solder and operates to maintain it at substantially uniform temperature by cutting the heating unit 7 in and out of its electric circuit at proper intervals. Preferably a box made of some insulating material such as asbestos is built around the solder container 11 to minimize heat loss and also danger of burns to an operator.

The solder container 11 may be secured in operating position to the upright supporting column 1 by means of a cooperating bracket 10, connecting bolts 21, and dog 43 which extends through an aperture 41 on a portion of the solder container. When the container is secured in position the gears 17 and 19 are submerged in the externally heated reservoir of solder 18. A housing member 13 extends about the gears with an inlet port 14 at one side thereof and a discharge port 16 adjacent the opposite side thereof. Gears 17 and 19 are mounted to fit closely with respect to the walls 20 of the housing 13 for a relatively large portion of their peripheries and mesh with each other adjacent the inlet port 14 and discharge port 16. A cover member 22 normally extends over the housing 13 and encloses the gears 17 and 19. The gears rotate in opposite directions with respect to each other, as indicated by the arrows shown on the gears, and pick up fluid adjacent the inlet port 14 of the housing and discharge it into the exit port 16 of the housing. The exit port 16 connects with an exit passage 23 which will be described hereinafter.

Rotation of the gears 17 and 19 is effected by a shaft 25 keyed to the gear 17. The shaft 25 extends upwardly through the cover portion 22 of the housing 13 and is retained in upright position by brackets 26 and 28 secured to the upright column 1. A relatively large pulley or belt wheel 30 is keyed to the upper end of the shaft 25 and is rotated by an electric motor 29 through the intermediation of a pulley 31 and belt 32. The pulley and belt drive acts as a speed reducer between the motor 29 and shaft 25. Rotation of the gear 17 turns the gear 19 which is in meshing relation therewith.

The second gear 19 is mounted upon a hollow shaft 34 which is keyed thereto so that it may be rotated by the gear 19. The hollow shaft 34 extends completely through the second gear 19 and connects with the passageway 23 leading from the exit port 16 of the housing 13. In operation the gears are submerged in the liquid solder 18. Rotation of the shaft 25 turns the gear 17 and meshing gear 19 and causes the liquid solder 18 to flow through the inlet port 14 and out through the discharge port 16. From the discharge port 16 the liquid solder 18 passes through the discharge passageway 23 and up through the hollow shaft 34 keyed to the center of the second gear 19. The liquid solder flows out of the upper end of the hollow shaft 34, over the outer convex surface of the member 35. An article to be coated with solder, in this instance, the cap of an armor piercing shell, is placed into the overflow or stream of molten solder and is rapidly heated thereby.

In addition to bringing the article into contact with the liquid solder the preferred embodiment wipes or rubs the solder against the surface of the article so that the solder will adhere firmly thereto. This rubbing action is achieved by means of an enlarged head member 35 screwed or otherwise secured to the end of the hollow rotating shaft 34. The enlarged rotating head 35 preferably has a contour similar to that of the shell case to which the cap is to be attached. Thus, when an armor piercing cap 6 is placed over the rotating head 35 and hollow shaft 34, solder squirts up into the cap and is thrown outwardly to cover the entire concave inner walls. As the cap is pressed downwardly over the rotating head 35 the pressure between the cap 6 and the rotating head spreads a coating of solder substantially uniformly over the interior of the cap and causes the solder to adhere firmly to the concave surface of the cap. Preferably the rotating head 35 is provided with a plurality of raised portions or ribs 37. It has been found that this facilitates the wiping action or friction effect between the cap and rotating head and the adherence of the solder to the cap 6. The length of time required to cause a smooth, substantially uniform layer of solder to adhere to the concave surface of the cap depends upon the size of the cap, but in most instances only two to three seconds are required.

In Fig. 5 there is illustrated a modified form of rotating head which may be utilized to apply solder to the convexly curved ends of shell cases similar to that shown in Fig. 4. In this instance a hollow rotating conduit 34a has secured to the upper end thereof a hollow rotating head 35a provided with ribs or raised portions 37a. Solder flows upwardly through the rotating pipe 34a to fill the concave rotating head and excess solder spills over the edges thereof to fall back into the solder reservoir 18. A shell case 3 may be inserted into the open end of the rotating head 35a and pressed downwardly so that it seats against the ribs 37a. The ribs smear or rub solder against the pointed end of the shell case and cause a uniform layer of solder to adhere thereto.

The solder container 11 is provided at the rear thereof with a downwardly extending leg or extension 40 having an aperture 41 therein. In normal position the rear wall of the box 11 extends upwardly behind the downwardly extending bracket 10 which supports the gear casing and the leg 40 extends downwardly alongside of the upright column 1. In this position a locking dog 43 projects through the aperture 41 in the downwardly extending leg 40 of the solder pot 11 and holds it in position. The locking dog 43 may be moved back in opposition to a spring 44 to remove the end of the dog from the aperture 41 and to thus allow the solder pot 11 to be removed. This construction facilitates inspection and cleaning of the parts of the device.

When it is desired to operate the device the switch 21 is closed to pass current through the heating means 7. The heat control mechanism 8 regulates the temperature of the solder within the container 11 and maintains the solder in molten condition. When the solder has become melted and is at the correct temperature the switch 24 may be pushed to start the electric motor 29, which is connected by pulleys and a belt with the upper end of shaft 25; this turns the shaft 25 and operates the submerged gears 17 and 19. The gears draw in molten solder through the inlet port 14 and discharge it through exit port 16 and passageway 23 to the interior of the hollow rotating shaft 34. The molten solder flows upwardly through the hollow shaft 34 and diverges outwardly at the end of the shaft 34. A cap 6 of an armor piercing projectile may be placed so that its interior surface rubs against the spaced ribs 37 on the rotating head. The spaced ribs 37 rub against the concave surface of the cap 6 and spread solder over it. The concave surface of the cap 6 is thus rapidly heated and "tinned" or coated with solder. The layer of solder is applied smoothly and is of substantially uniform thickness. The operation of the device is similar when utilized with a concave shaped rotating head 35a for applying solder to the pointed end of a shell case 3.

It will be seen that the present invention provides a new and improved means and method for applying solder to articles and particularly to concave articles such as the caps of armor piercing projectiles. The device and method are simple in construction and operation and minimize the necessity of manual operations in applying solder to articles. Solder may be spread smoothly and uniformly over the surface of an article without requiring any special skill on the part of an operator. The device is readily adaptable to the coating of shell caps of any size or shape and is rugged in construction and well able to withstand any rough usage to which it may be subjected.

As various changes may be made in the form, construction and arrangement of the parts herein without departing from the scope and spirit of the invention and without sacrificing any of its advantages, it is to be understood that all matter herein is to be interpreted as illustrative and not in a limiting sense.

Having thus described my invention, I claim:

1. In a device adapted to be used for applying solder to the inner surfaces of hollow members such as caps for armor piercing shells, the combination of means for directing a stream of liquid solder against the inner surface of one of said hollow members, and rigid rotating means fitting into said inner surface for simultaneously rubbing said solder against said inner surface so that a substantially uniform layer of solder adheres to said inner surface.

2. In a device adapted to be used for applying solder to the inner surfaces of hollow members such as caps for armor piercing shells, the combination of means for directing liquid solder against the inner surface of one of said hollow members, and a rotating member having a contour corresponding substantially to that of said inner surface and adapted to spread a coating of said solder substantially uniformly over said inner surface.

3. A device of the class described comprising, in combination, means for directing molten solder against the surface of an article, and a rotating member having a plurality of ribs thereon corresponding substantially in contour to the contour of the surface of said article, said ribs being adapted to rub solder against the surface of said article thereby to cause a layer of solder to adhere to said surface.

4. A device adapted to be used for applying solder to the inner surfaces of hollow members such as caps for armor piercing shells, comprising, in combination, a rotatable member having a contour corresponding substantially to that of the inner surface of one of said hollow members, a conduit operatively connecting with said rotatable member for conveying solder to the exterior surface of said rotatable member and means for forcing solder through said conduit.

5. In a device of the class described, the combination of a substantially upright member, a supporting bracket secured to and spaced from said upright member and carrying a solder-applying device, a solder container for said applying device having a side portion adapted to be positioned intermediate said upright member and said supporting bracket and a retractable member adapted to detachably support said container to maintain the side portion of the container intermediate said upright member and supporting bracket.

6. In a device of the class described, the combination of an upright member, a supporting bracket secured to and spaced from said upright member and carrying a solder-applying device, a solder container for said applying device having a side portion adapted to be positioned intermediate said upright member and said supporting bracket and having a depending part, and a retractable member adapted to engage said depending part and to detachably support said container to maintain the side portion of the container intermediate said upright member and supporting bracket.

7. A device of the class described, comprising, in combination, a gear pump with an inlet and a discharge port and a plurality of gears, driving means connected with one of said gears, a tubular member carried by a second of said gears, and a conduit connecting said discharge port with said tubular member and conducting solder forced by said gears through said discharge port to said rotatable tubular member.

8. A device of the class described, comprising in combination, a gear pump with an inlet and a discharge port and a plurality of gears, a drive shaft connected with one of said gears, a tubular shaft supporting a second of said gears and rotated thereby, and a conduit connecting said discharge port with said tubular shaft and conducting solder forced by said gears through said discharge port to said rotatable tubular shaft.

9. In a device adapted to be used for applying solder to the surfaces of hollow members, the combination of a housing, a conduit leading from said housing to the inner surface of a hollow member, a plurality of gears in said housing for directing molten solder through said conduit against the inner surface of a hollow member, and rotatable applicator means on said conduit for spreading a coating of said solder substantially uniformly over said surface to be soldered.

10. A device adapted to be used for applying solder to the inner surfaces of hollow members such as caps for armor-piercing shells, comprising, in combination a member having a rigid contour corresponding substantially to that of the inner surface of one of said hollow members, means connected with said latter contoured member for forcing molten solder through the contoured member into the space between the contoured member and said hollow member and means for rotating said contoured member to spread the solder on the inner surface of said hollow member so that solder spreads between them.

11. The method of applying solder to an article which comprises delivering a stream of molten solder to the article through a member having a rigid surface which rubs across the article so that the solder flows between the surface of the article and the rigid surface and a coating of the solder is distributed around the stream and covers a wide area of the article.

12. The method of applying solder to the hollow face of an article which comprises delivering a stream of molten solder to the hollow face through a member having a rigid surface which rubs over the hollow face so that the solder flows between the surface of the article and the rigid surface and a coating of the solder is distributed around the stream and over the hollow face and covers said face.

EMIL R. CAPITA.